United States Patent [19]

Mortensen et al.

[11] 4,173,257
[45] Nov. 6, 1979

[54] ROOT CROP HARVESTER

[75] Inventors: Donald G. Mortensen, San Jose; James T. Browning, Sunnyvale, both of Calif.

[73] Assignee: FMC Corporation, San Jose, Calif.

[21] Appl. No.: 823,781

[22] Filed: Aug. 11, 1977

[51] Int. Cl.² ............................................. A01D 27/00
[52] U.S. Cl. ......................................... 171/33; 171/61
[58] Field of Search .................... 171/31, 32, 33, 36, 171/61; 56/98

[56] References Cited

U.S. PATENT DOCUMENTS

| | | | |
|---|---|---|---|
| Re. 23,565 | 10/1952 | Waack et al. | 171/61 |
| 1,075,884 | 10/1913 | Weaver | 171/61 |
| 1,894,802 | 1/1933 | Urschel | 171/33 |
| 1,928,868 | 10/1933 | Horn | 56/157 |
| 1,936,760 | 11/1933 | Hitchcock | 56/103 |
| 1,964,896 | 7/1934 | Urschel | 171/33 |
| 2,368,895 | 2/1945 | Spiegel | 171/36 |
| 2,546,411 | 3/1951 | Vella | 171/36 |
| 2,562,400 | 7/1951 | Urschel | 171/33 |
| 2,792,864 | 5/1957 | Krier et al. | 171/61 |
| 2,833,357 | 5/1958 | Lust | 171/61 |
| 2,949,716 | 8/1960 | Thomson | 56/143 |
| 3,586,108 | 6/1971 | Wedgeworth et al. | 171/61 |
| 3,743,024 | 7/1973 | Mayo et al. | 171/61 |

*Primary Examiner*—Russell R. Kinsey
*Assistant Examiner*—Paul J. Hirsch
*Attorney, Agent, or Firm*—J. F. Verhoeven

[57] ABSTRACT

A two-row crop harvester for carrots, beets, etc. has a wheeled chassis with a forward cab disposed to one side of a pair of lifter frame assemblies. Each lifter frame assembly has a main component with a forwardly gathering element rigidly connected to a rearward mounting element. The rear end of the mounting element is pivotally mounted on a rocking frame, the lower end of which is pivoted about a horizontal axis on the main frame of the harvester. The main component of each lifter frame assembly mounts a relatively movable gathering component. The topping bar units have both their driven and idler ends supported by the main component of the lifter frame assembly. The rear drive pulleys for the gathering belts are chain driven from the drive shafts of the topping units and the latter are individually driven by hydraulic motors and articulated shafts with the motors geared together so that the topping bar units are synchronized.

11 Claims, 12 Drawing Figures

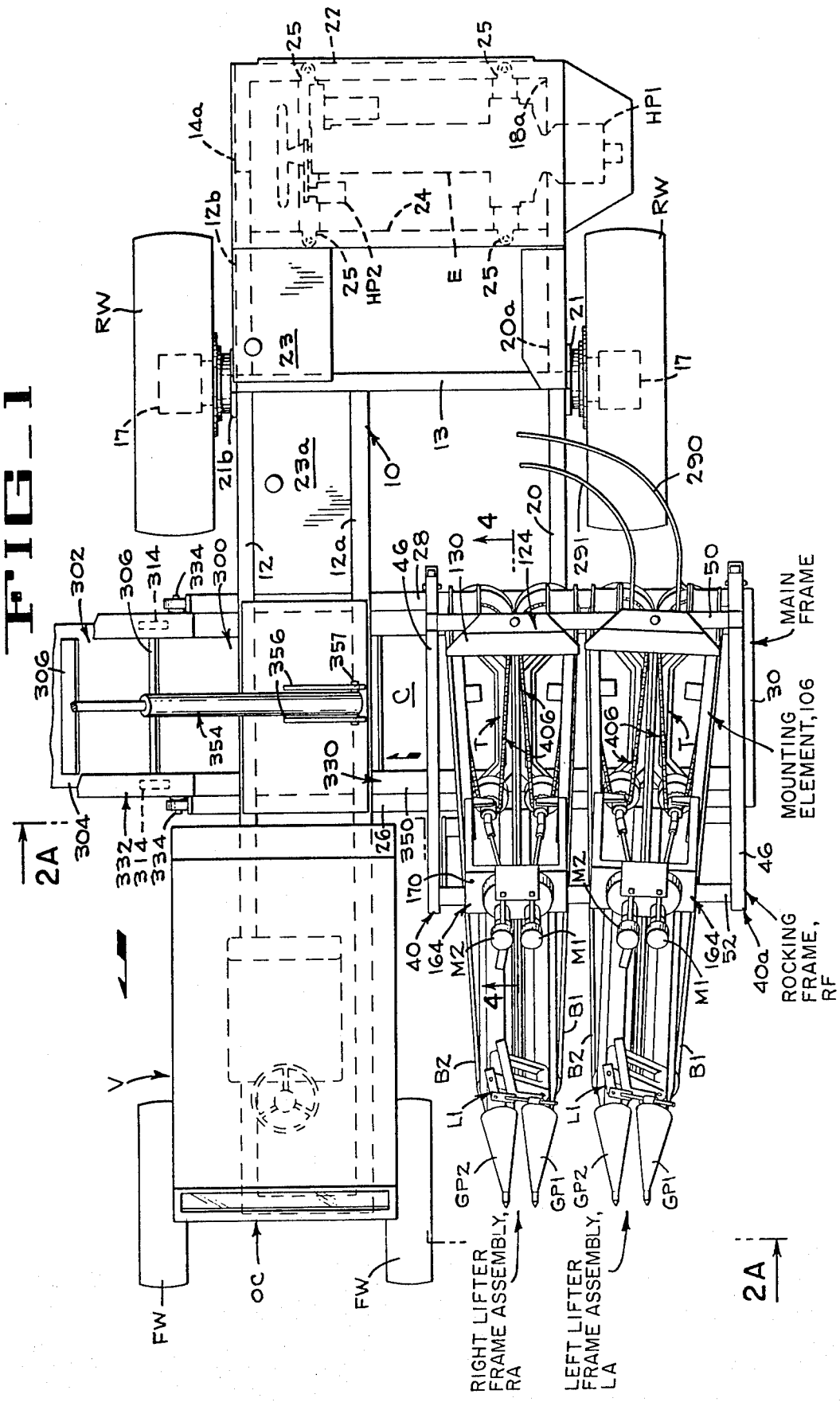

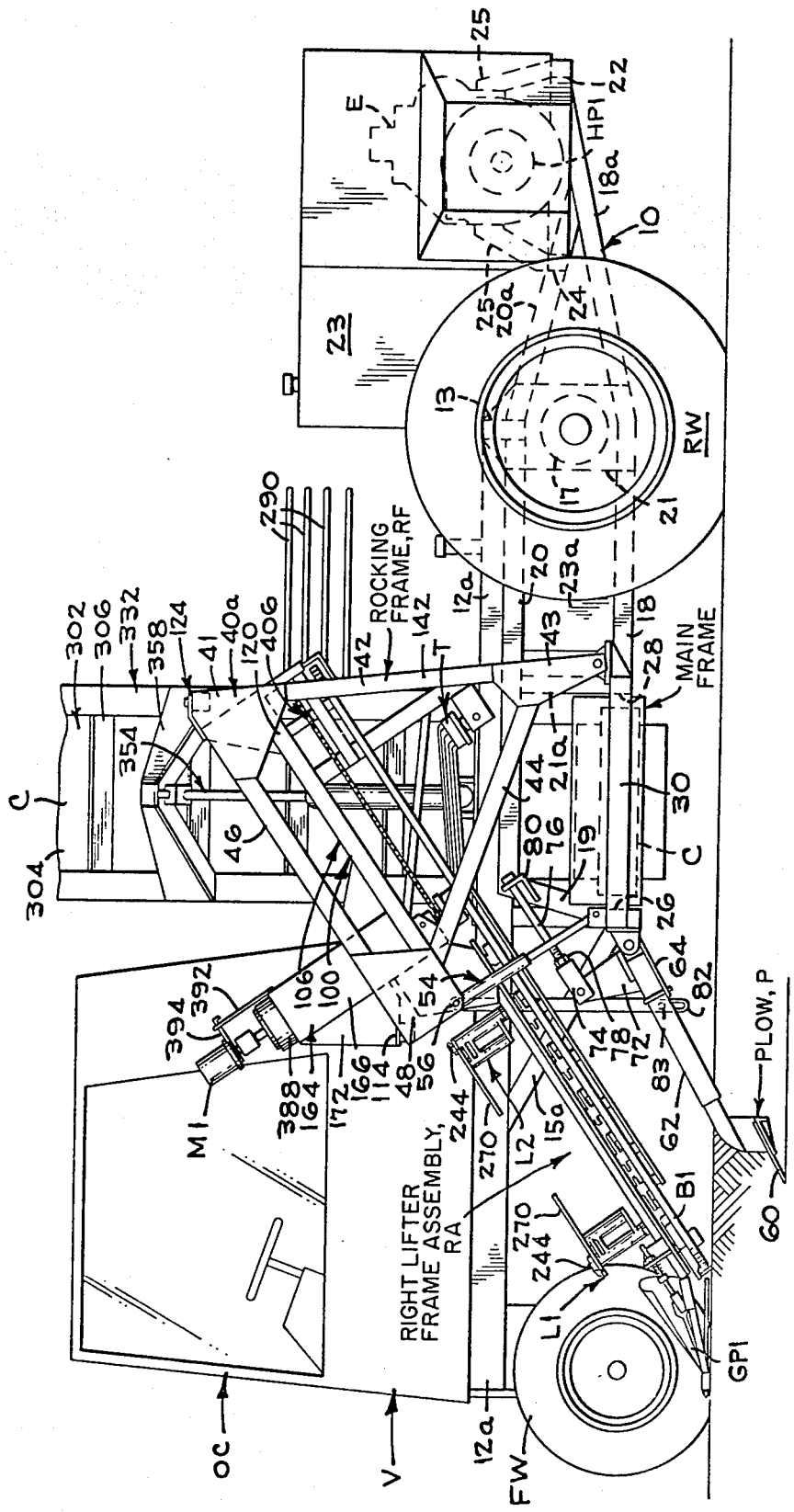

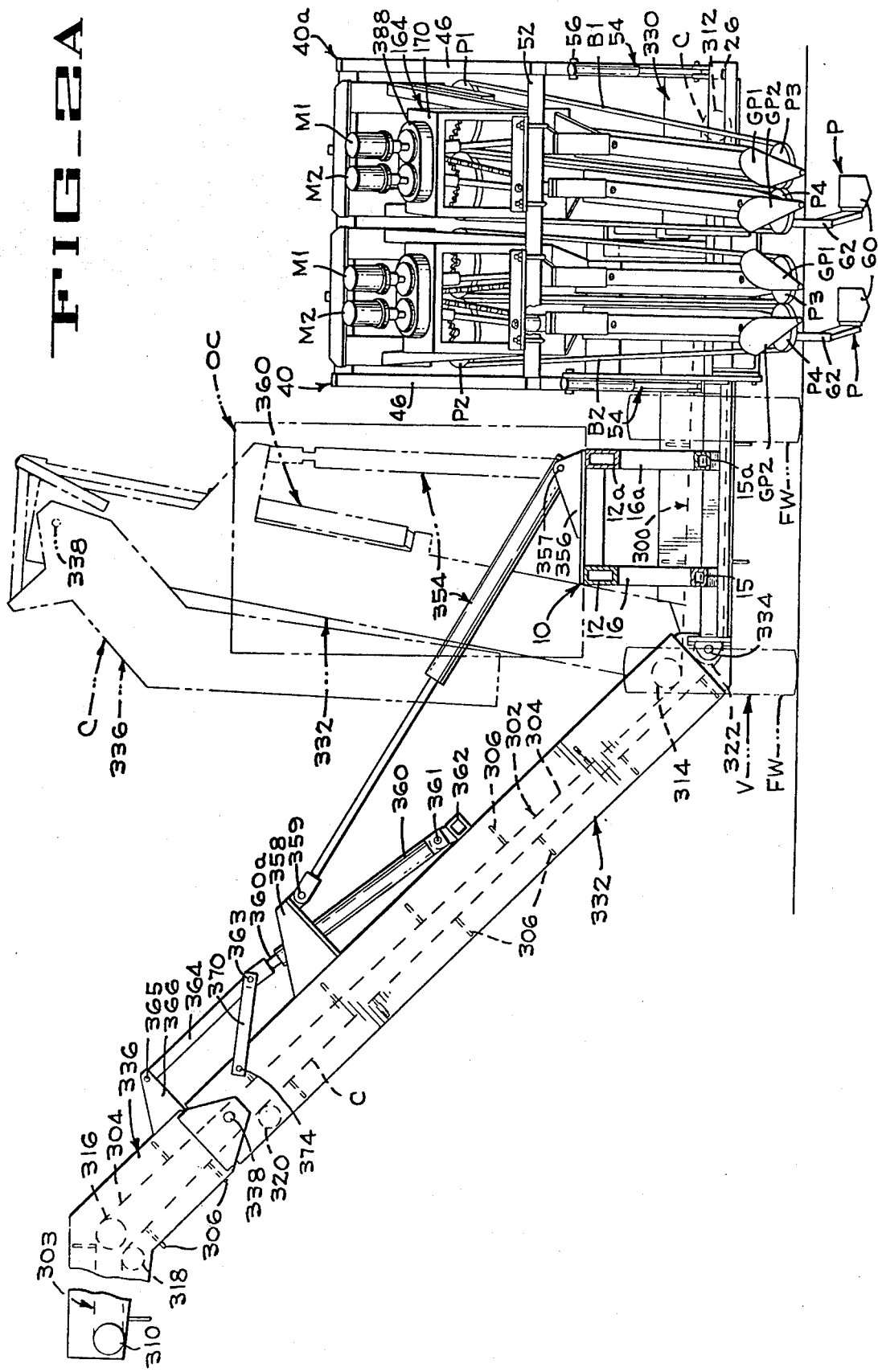

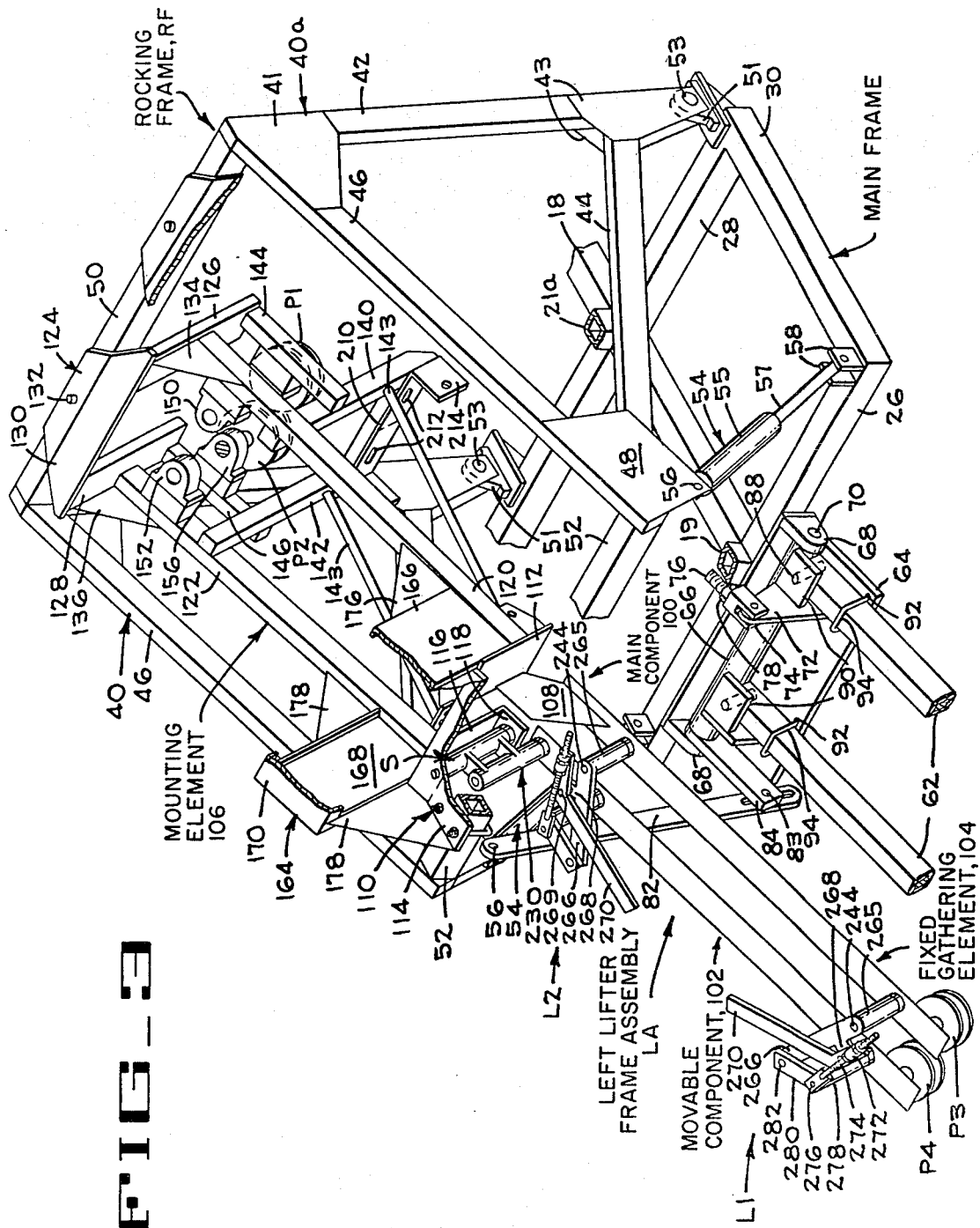

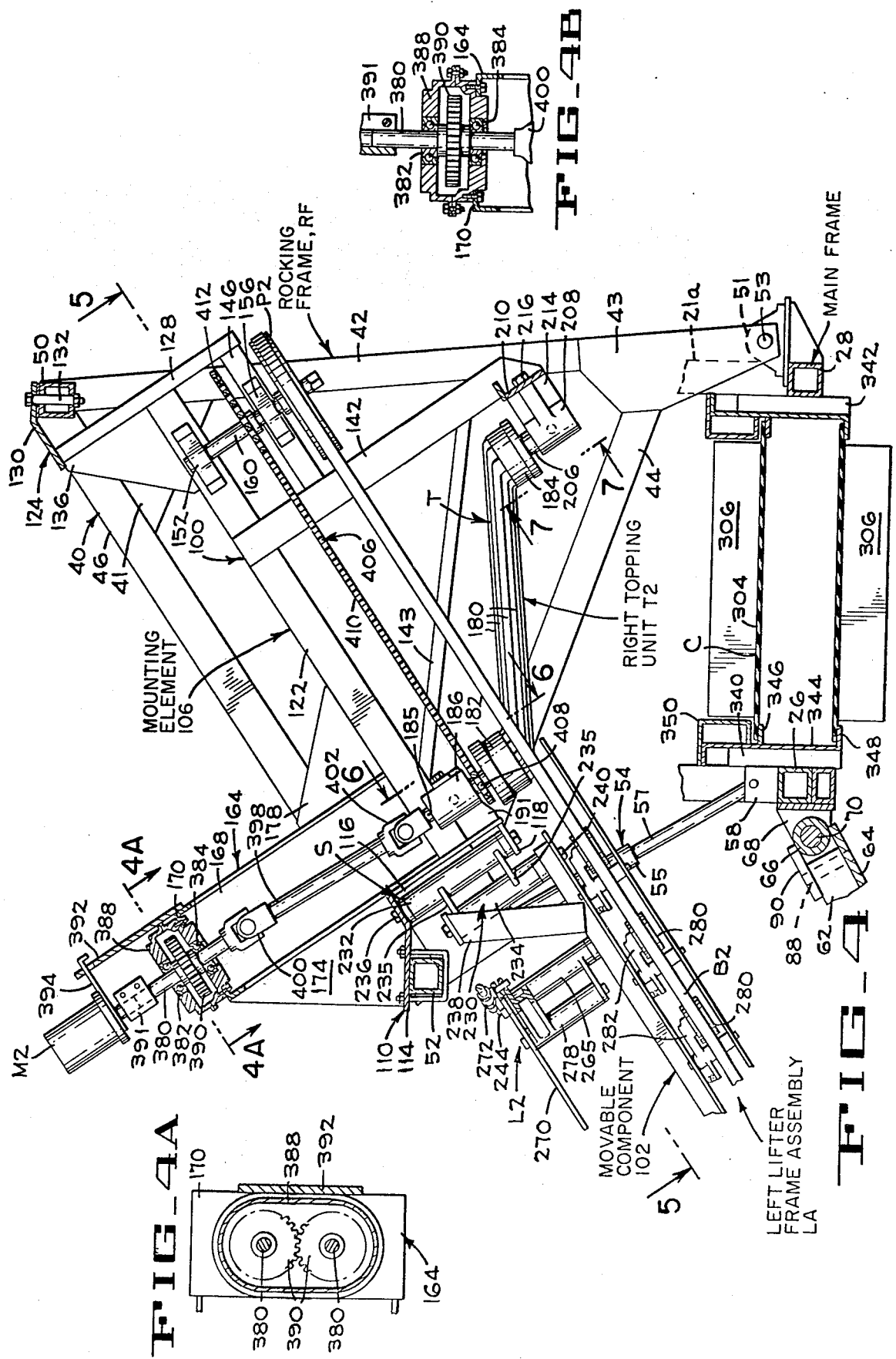

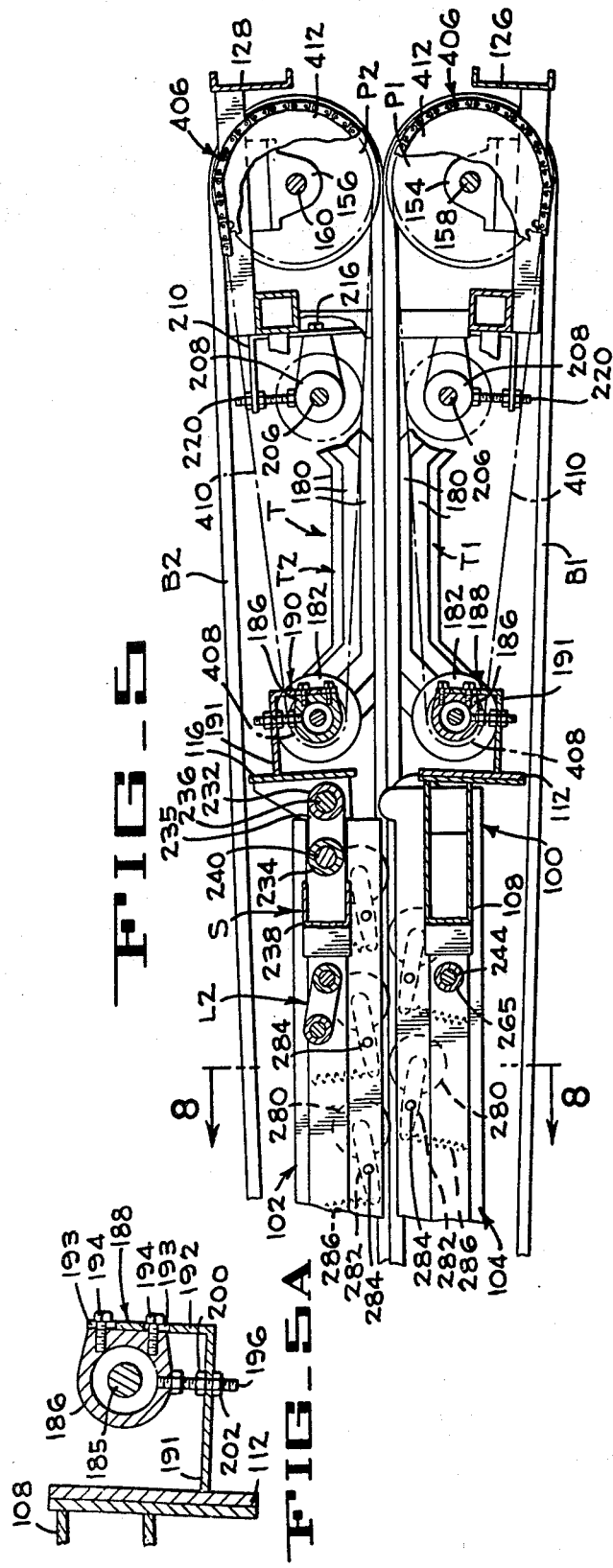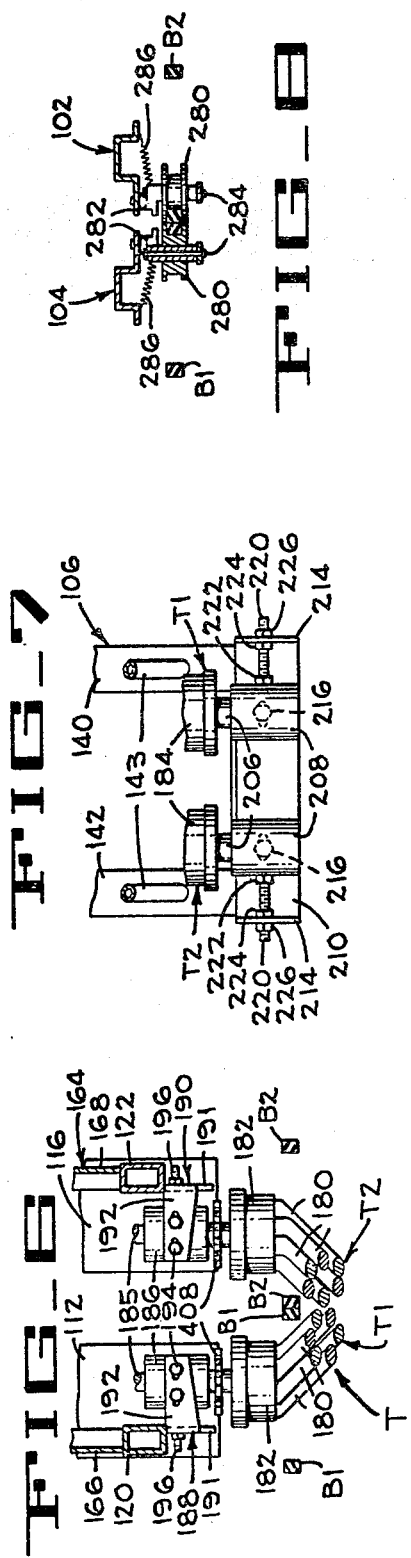

ROOT CROP HARVESTER

FIELD OF THE INVENTION

This invention relates to harvesters and more particularly to root crop harvesters for harvesting carrots, beets or the like.

DESCRIPTION OF PRIOR ART

The patent to Urschel U.S. Pat. No. 1,964,896, July 13, 1934, discloses a single row beet harvester having a product lifter assembly that comprises right and left puller frames 38 with each frame having a gathering point at its front end and a lifter chain 57 running along its length. The individual lifting frames are connected at their front and rear end by structure which allows the frames to spring apart when they encounter an overload or obstructions. The front end of the lifter frame assembly is vertically supported by a manually adjusted spring and crank assembly from the main frame adjustable by the hand lever 95. The rear end of each puller frame (FIG. 5) mounts an upstanding bracket 128 which is pivotally mounted about a longitudinal axis at 113b, 114b, on a housing 40 that encloses bevel driving gears for the lifter chain pulley 56, as well as for the driven end 115 of a topping bar unit of known construction. The housing 40 is pivotally connected by a pivot 67 to a rear housing 65 that houses the final bevel gear drive for the rear pulley of the lifting chain. A universal joint 66 is inserted in the drive shaft to accommodate the aforesaid pivoting action while maintaining the drive. In order to further accommodate lateral swinging of the entire lifter frame assembly, a link 43 and pins 41,42 (FIG. 5) connects each lifter frame with the housing 40. The puller frames can be shifted laterally by foot pedals 102,104 (FIG. 2) rod 106 and bell crank 84, the operation of which parts is not clear.

In order to mount the rear end of the lifter frame assembly of the Urschel patent for accommodating raising and lowering motion of the gathering points, the housing 40 is connected to the front ends of spaced pivoted arms 44,45 (FIG. 2). A mid-portion of each arm 44,45 is pivotally mounted on the main frame as shown in FIG. 6, but the arms 104,105 are not laterally shiftable. The rear idler ends 116 of the topping bar units are not supported by the lifting frame assembly, but are supported at the rear ends of pivoted arms 44,45 by sliding rods such as the rod 117 shown in FIG. 16. It has been found that such sliding constructions become fouled and frozen under field operating conditions.

Applicants did not invent the general layout of a self-propelled two-row carrot harvester wherein the two lifter frame assemblies are disposed at one side of a windowed cab supported on two steerable wheels so that the operator can observe directly the guidance of the gathering points. Also, applicants did not invent the basic concept of mounting the lifter frame assemblies (but not the topping bar assemblies) in a rocking frame having side members that are pivoted to the main or chassis frame and which has a front transverse member that adjustably supports the front ends of the lifting frame assemblies. These broad concepts are embodied in one or more harvesters that have been field operated in England. The topping bar assemblies of the aforesaid foreign harvesters are not supported on the lifter frames but are supported on the main frame at both their driven and idler ends.

A two-row self propelled carrot harvester known as the "Dixon-Y" harvester has been tested in the United States and forms the subject matter of the copending application of Williams et al, Ser. No. 790,355 filed Apr. 25, 1977 and assigned to the FMC Corporation. In this harvester the operator is also positioned at one side of the gathering mounts of the lifting frame assemblies. Each lifting frame assembly has frame structure that mounts the drive pulleys for the lifter belts with the pulleys disposed behind the driven ends of the topping bar units. Each lifting frame assembly is pivotally mounted in an inverted U-shaped yoke for vertical motion about a horizontal axis. Each yoke is pivotally mounted on the main frame for swinging motion about a vertical axis. Both ends of the topping bar units are supported on the main or vehicle frame. One topping bar unit of each topping bar assembly is driven by a single hydraulic motor on the main frame connected to the driven end of that topping bar unit by an articulated shaft. The cooperating topping bar unit is driven mechanically from the driven half of the first unit. The two drive pulleys for each lifter frame assembly lifter belt are driven by separate hydraulic motors mounted on each lifter frame assembly.

The patent to Spiegel U.S. Pat. No. 2,368,895, Feb. 6, 1945, discloses a carrot and onion harvester wherein the lifter belt pulleys are supported on parallel channels 48,49 (FIG. 3). The channels are connected at their rear ends by cross arms 35 and at their front ends by cross arms 52. The rear cross arm 35 of each assembly is pivotally mounted at 32 on a transversely mounted suspension channel 25, which channel is pivotally mounted at 24 on the main frame 15 for vertical motion of both lifter frames about a horizontal axis under control of a hand lever 75. The spacing between the front ends of the two lifting frame assemblies is adjusted by tongs 85 which can be separated or brought together by a crank 93 operating a V-shaped spreader 89 (FIG. 2). The Spiegl patent does not employ topping bars.

The patent to Urschel, U.S. Pat. No. 2,562,400, July 31, 1951, discloses a root crop harvester having right and left puller frames RP,LP with associated puller chains supported at their front ends by arch bracket 82 and at their rear ends by an arch bracket 91. As seen in FIG. 6, the rear arch bracket 81 for the puller frame assembly is pivotally mounted for vertical motion of the assembly about pivots 89 on brackets 90 integral with the frame 7. Although the specification describes utilization of the bar 121 by an operator on an associated seat for laterally swinging the puller frames relative to the main frame, it is not seen how this operation is possible in view of the mounting of rear end bracket 81 for the puller frames shown in FIG. 6 of the patent.

The topping or roller bar assemblies are mounted directly on the frame as seen in FIG. 7 and have only one driven end, the rear end projecting free, cantilever fashion. Vertical motion of the puller frames about the pivots 89 (FIG. 6) flexes the puller frame chains and moves these chains relative to the fixed topping bars which are mounted on the frame. The rear puller chain sprockets 91,93 are driven by chains 44 (FIG. 1) that are in turn driven by the sprockets 43 (FIG. 7) on the upper ends of the drive shafts 135 for the topping bars.

The U.S. patent to Wedgeworth No. 3,585,108, June 22, 1971, discloses a single row celery harvester wherein the puller frame and puller belts mounted thereon are pivotally mounted on the main frame at the rear end of the puller frame by means of a C-shaped bracket 60 (FIG. 6) which is mounted on a pivot pin 62 secured to a main frame member 48 (FIG. 5). There are no topping bars.

In the description of the present invention that follows elements of the prior art often referred to as "puller frames," "puller belts," etc., and will be referred to as lifter assemblies, lifter frames, lifter belts, etc., because their primary function is that of lifting crops dislodged by the plow and they lift the crop upwardly and rearwardly for introduction of the tops of the crop to topping bars (sometimes called roller bars in the prior art).

SUMMARY OF THE INVENTION

The root crop harvester of the present invention is of the type comprising a wheeled chassis including a main frame and the usual plow for loosening and lifting the crop. The harvester includes what will be termed a product lifter frame assembly which comprises right and left gathering components each mounting a gathering point and a forward idler pulley for a lifter belt with adjacent reaches of the lifter belts resiliently cooperating to lift and rearwardly advance the crop by its top foliage, leaves, etc. for delivery to a topping bar assembly. In the harvester of the present invention both the driven and the idler ends of the topping bar assembly are completely supported by a rigid main component of the lifter frame assembly, thereby providing a lifter frame assembly which can be completely assembled, and adjusted before it is installed in the harvester. Also, each lifter frame assembly, including the topping bars, forms a rigid unit, which is pivotally supported at its rear end to accommodate guidance and positioning of the assemblies relative to one another (on a two row harvester) as well as relative to the main frame or chassis for alignment with crop rows. Since each topping bar assembly is completely supported on its lifter frame, neither lateral nor vertical adjustment of the lifter frame on the harvester requires prepositioning and readjustment of the topping bar units.

The gathering components of each lifter frame assembly include a normally fixed component and a relatively movable component with manually operable spreader arch units interconnecting the components so that the movable component can be separated or spread from the fixed component in case of jams or the like, as well as for belt installation and replacement. In prior harvesters, the movable gathering component was slidably supported on the fixed gathering element or component. In the harvester of the present invention, the rear end of the movable gathering element or component is swingably mounted on a mounting frame component which rigidly supports the other or fixed gathering element or component. This swinging mounting is by means of a link or eccentric, the rear end of which is pivotally mounted on the mounting frame component of the main component of the gathering frame. The front end of the link pivotally supports the rear end of the movable gathering component. This eliminates the undesirable sliding connections previously employed, the slide bars of such connections being subject to rust and to build up of foreign matter which impeded the lateral motion of the movable gathering component.

As to the drives for the topping units of each topping bar assembly and the associated rear drive pulley for a lifter belt, under the broader aspects of the present invention a chain and sprocket assembly connects the drive shaft for each topping unit (one side of a topping bar assembly) to the drive shaft for the associated rear lifter belt pulley. A motor, such as a hydraulic motor, drives the chain and sprocket assembly. Although the motor could be positioned to directly drive either the drive shaft of the associated topping bar unit or the drive shaft of the associated rear lifter belt pulley, in the preferred embodiment the motor drives the topping unit directly through an articulated shaft. Preferably a separate motor is provided for each topping unit of a topping bar assembly and pulley combination, but these motors are synchronized by interconnecting gearing.

As mentioned, the main component of the lifter frame assembly includes a mounting element. The mounting element is a rigid box-like structure having laterally spaced, longitudinally coextensive side frame structures connected by front and rear cross frame structures. One of the side frame structures of the main component mounting element (the outer or left side in the illustrated embodiment) forms a rearwardly continuation of the gathering element of the main component. The forward end of the other side frame structure of the main component mounting element swingably mounts the rear end of the movable gathering component of the lifter frame assembly, as previously described.

As mentioned, each lifter frame assembly includes a topping bar assembly for removing the tops or foliage from the root crop, which assembly comprises cooperating right and left elongate topping units for receiving the crop from the lifting belts and with each topping unit having a driven end and an idler end, with means for driving the lifter belts and the driven end of each topping unit.

The lifting frame assembly, (or two assemblies if the harvester is a two row harvester) is mounted on the harvester by a rocking frame that includes laterally spaced triangular side frames, the lower corners of which are pivotally mounted on the main or chassis frame. The triangular side frames are connected by lower front and upper rear transverse members. The front portion of the mounting element of the main component of the lifter frame assembly is adjustably clamped on the lower forward transverse member of the rocking frame, for accommodating lateral adjustment of the gathering points relative to the main frame and to crop rows as the lifter frame assembly swings about its rear pivot.

In accordance with the present invention, the lifter frame assembly, including the main and movable lifter frame components, the crop lifting belts and the topping units form an integrated unit. The mounting element of the main component of the lifting frame assembly extends rearwardly past the topping units and the rear cross frame structure of the mounting element is pivotally mounted on the rear transverse member of the rocking frame to provide the aforesaid rear pivot for accommodating lateral adjustment of the gathering points. Furthermore, and as mentioned, in accordance with the present invention, means are provided for mounting both the driving and the driven ends of each topping unit directly on the mounting element of the main component of the lifter frame assembly. This structure has several advantages including the fact that (as mentioned previously), as a lifter frame assembly is swung laterally for guidance relative to a row about the rear pivot, the topping bar assembly moves directly with the lifter frame assembly and no misalignment occurs between the lifter belts and the topping units making up the topping bar assembly. Also, as the rocking frame is pivoted on the main frame about a horizontal axis for vertical adjustment of the gathering points relative to the ground, there is no flexing of the lifter belts in the vicinity of the entry ends of the topping units and optimum alignment of the lifter belts with the topping assembly is maintained at all positions of the lifter frame assembly.

As previously stated, the unitary assembly of the lifter frames, lifter belts, topping units and their drives also makes it possible to assemble adjust and test each lifting frame assembly as a complete unit in the shop before installation in a harvester. This obviates reliance on structure that is normally installed on the harvester for final mounting and adjustment of the parts. This can be done by energizing the lifter frame assembly drive motors and operating the entire assembly in the shop for adjusting clearances and for performing any preliminary trouble shooting that might otherwise be necessary when the units are installed in a complete harvester and are hence not as accessible for adjustment and possible realignment or replacement of malfunctioning parts.

Also, in accordance with a preferred embodiment of the present invention, each topping frame assembly includes a simple and rigid structure for mounting the drive mechanism for both the topping assemblies and the lifter belts. This function is provided by the front cross frame structure of the mounting element portion of the main component of the lifter frame assembly. The aforesaid front cross frame structure includes an inverted U-shaped bracket having legs projecting upwardly from the side frame structures of the mounting element of the main component of the topping frame assembly and a cross leg connecting the bracket legs with motors on the cross leg. Each topping unit of the topping assembly is individually driven by an articulated shaft connecting one motor to the driven end of its associated topping unit. The two motor shafts for the individual topping units are mechanically synchronized by drive elements, such as meshed gears. This makes the motors, which are preferably hydraulic motors, accessible for maintenance and replacement as well as for initial connection of the lines thereto.

Furthermore, in accordance with the present invention, the same motors that drive the topping units drive the rear pulleys for the lifter belts. As mentioned, this drive is provided by a sprocket and chain driven assembly that is driven from a sprocket located at a zone adjacent the driven end of each topping unit and the chain drives a sprocket on a short shaft mounting the rear pulleys for driving the lifter belts.

In accordance with the present invention, the driven ends of the topping units of each mounting frame assembly are supported directly on the mounting element of each lifter frame assembly by brackets that depend from the side frame structures of the mounting element to a position wherein they can support the idler ends of the topping units in the desired final alignment of cooperating topping bar units and in a manner which makes the driven ends of the topping units readily accessible for repair and maintenance. Means are also provided for adjustably mounting both the driven and the idler ends of each topping unit on the mounting element of each lifter frame assembly.

BRIEF DESCRIPTION OF THE DRAWINGS

FIG. 1 is a plan view of the entire harvester with the discharge conveyor broken away.

FIG. 2 is a side elevation of the harvester with the upper portion of the discharge conveyor broken away.

FIG. 2A is a section taken on line 2A—2A of FIG. 1, looking from the front of the harvester.

FIG. 3 is a partial diagramatic perspective showing a portion of one gathering frame assembly mounted on the rocking frame, the plow supports and a portion of the main frame (chassis) that supports the rocking frame.

FIG. 4 is an enlarged fragmentary sectional view taken on line 4—4 of FIG. 1.

FIG. 4A is a section taken on line 4A—4A of FIG. 4 showing the gearing interconnecting the hydraulic drive motors.

FIG. 4B is an enlarged fragmentary section through the synchronizing gear box.

FIG. 5 is a partial plan view of one of the gathering frame assemblies, including the topping bars.

FIG. 5A is an enlarged fragmentary section showing the adjustable mounting of the driven end of a topping unit.

FIG. 6 is a section through a topping frame assembly taken on line 6—6 of FIG. 4.

FIG. 7 is a view of the idler ends of the topping bar units as indicated at 7—7 of FIG. 4.

FIG. 8 is a section through the gathering elements of a lifter frame assembly taken on line 8—8 of FIG. 5.

MAJOR COMPONENTS OF THE HARVESTER

Referring to FIGS. 1, 2 and 2A, the harvester disclosed is a two-row harvester mounted on a self-propelled vehicle V. Although a harvester for harvesting two rows simultaneously will be disclosed in detail, the principles of the present invention are applicable to a harvester which harvests a single row.

The vehicle V is a power driven vehicle having a main frame and chassis structure to be described presently. Pivotally mounted on the main frame of the harvester is a rocking frame RF which supports, (in the case of a two-row harvester) right and left lifter frame assemblies RA,LA. These assemblies lift root crops by their foliage, the roots of which are loosened and uprooted by a plow P associated with each assembly. The lifter frame assemblies include crop gathering points GP1, GP2 and opposed lifter belts B1,B2 for picking up and lifting the uprooted crop by its foliage and delivering the foliage to topping bar assemblies T, which pinch off the foliage and drop the roots onto a transverse conveyor C. The conveyor C includes a lower crop catching reach, an elevating reach (FIG. 2A) and a discharge reach for delivering the crop to a vehicle, truck or cart that is moving along the field parallel to the harvester.

CHASSIS COMPONENTS

Referring to FIGS. 1–3, the chassis 10 includes a rigid main frame structure, the structural details of which are not critical to the present invention but enough of the main frame structure will be described to provide an adequate explanation of the mounting of the other parts. Along the right side of the harvester, the main frame includes parallel, rigid box-like frame members 12,12a (shown in dotted lines in FIG. 1) which run from a front cross piece of the harvester frame to an intermediate wide cross-frame member 13. The main frame members 12,12a support a windowed operator's cab OC of the vehicle and are strengthened by longitudinal lower frame element, the front ends of which are connected to the main frame members 12,12a by front and rear diagonal truss elements. The front truss elements 15,15a are shown broken away in FIG. 2A. The left front truss elements 15a appears in the side view of FIG. 2. Vertical posts 16,16a (FIG. 2A) connect the longitudinal frame elements 12,12a with the lower longitudinal frame elements. Right side rear diagonal truss elements 12b and 14a (FIG. 1) extend from the rear end of the left main frame member 12 and from the lower longitudinal frame elements but these do not appear in the side view of FIG. 2 of the drawings because they are parallel to outer truss elements 18a and 20a, to be described presently.

The chassis 10 mounts steerable front wheels FW and driven rear wheels RW, the arrangement of these wheels being shown in the plan view of FIG. 1. The rear wheels are driven by hydraulic hub motors 17 of commercial design, the details of which are not critical to the present invention.

In order to support the plows P and the rocking frame RF for the lifter frame assemblies, an outrigger frame construction is provided which, as seen in FIG. 1 is to the left of the longitudinal frame elements 12,12a.

The outrigger frame construction includes a lower longitudinal frame member 18 (FIGS. 2 and 3) from which the lower truss 18a extends and an upper longitudinal outrigger frame member 20 from which the truss 20a extends (FIGS. 1 and 2). The front ends of the outrigger frame members 18,20 are joined by a slanted, upwardly extending post 19, shown in FIG. 2, and the lower end thereof appears in FIG. 3. An intermediate vertical member 21a, shown in dotted lines in FIG. 2 also joins the longitudinal outrigger frame members 18 and 20. The rear ends of the frame members 18 and 20 are connected by a gusset plate 21 shown in dotted lines in FIG. 2, which are also connected to the angled rear truss members 18a,20a which are connected as seen in FIG. 2. A companion gusset plate 21b reinforces the right side frame members. At the rear of the harvester, a rear main cross piece and end support 22 connects the rear ends of the lower frame truss member or extension 14a and the rear end of the lower outrigger frame member extension 18a as seen in FIGS. 1 and 2. A parallel forward cross-frame member 24 extends between truss members 12b and 18a and the cross members 22,24 form the support for the engine mounts 25 of an engine E that powers the harvester, (FIGS. 1 and 2).

The engine E drives a hydraulic pump HP1 for supplying hydraulic fluid under pressure for the rear wheel motors 17. The connecting lines and operator controls for this and other hydraulic systems are not shown, these representing conventional modern hydraulic engineering practice and details thereof are not critical to the present invention. The engine E also drives a pump HP2 for driving auxiliary equipment, such as the hydraulic motors that operate the lifter frame assembly units as well as various hydraulic cylinders for raising the lowering the rocking frame and conveyor components. The lines and control elements for these hydraulic units are not illustrated or described because they represent mere conventional hydraulic engineering practice. In order to supply fuel for the engine and oil for the hydraulic unit tanks 23,23a are provided as best seen in FIG. 1.

The outrigger frame construction includes transverse horizontal frame members 26,28 appearing in FIGS. 1–4. The left or outer end of these frame members are connected by a short outboard longitudinal frame member 30 seen in FIGS. 1–3.

ROCKING FRAME

The rocking frame RF serves the function of pivotally supporting the right and left frame lifter assemblies RA, LA on the main frame of the harvester. The rocking frame can be vertically adjusted to position the gathering points of the lifter frame assemblies at their desired position relative to the surface of the ground as well as to lift the lifter frame assemblies clear of the ground for road transportation. The rocking frame also provides pivotal supports for lateral adjustment or swinging of the lifter frame assemblies relative to the main frame and relative to one another for alignment with rows of crops in the case of a two-row harvester. As previously mentioned, in the broader aspects of the invention, if a single row harvester is designed, only one lifter frame assembly will be mounted on a rocking frame.

The rocking frame RF is shown in FIGS. 1,2, 2A and 4, but the clearest overall illustration thereof appears in the diagramatic perspective of FIG. 3. Referring to these figures, the rocking frame RF is formed of rigid right and left side triangular frame structures 40,40a. These side structures are identical and a description of one will suffice for both. For example, referring principally to FIG. 3, the triangular left side structure 40a includes a generally vertical leg 42 connected by a pair of gusset plates 43 to a forwardly and upwardly projecting leg 44. The upper end of the leg 42 is connected by a gusset plate 41 to an upper, forwardly and downwardly extending leg 46. The leg 46 is connected to the leg 44 joined by gusset plate 48. The two triangular side structures 40,40a are connected by an upper rear cross member 50 and a lower forward cross member 52. The cross member 50 pivotally supports the lifter frame assemblies and the cross member 52 adjustably supports an intermediate portion of each lifter frame assembly.

The rear lower end of the rocker frame RF is pivotally mounted on the main frame of the harvester by means of ears 51 which are welded to the cross frame member 28 at laterally spaced locations. The side frame structures 40,40a of the rocker frame are pivotally mounted on the ears 51 by means of pivot pins 53 which extend through the paired gusset plates 43 that straddle the ears 51. In order to raise and lower the locking frame about the pivots 53 for either positioning the gathering elements of the lifter frame assembly in their operative position relative to the ground or for lifting them for road travel, the front gusset plates 48 are supported from the main frame by hydraulic cylinder assemblies 54. The cylinders 55 of the assemblies, are pivoted to the gussets 48 at pivots 56 and the piston rods 57 are pivoted to ears 58 on the main frame. The cylinders receive fluid under pressure from the accessory pump P2, previously mentioned, and are controlled by the operator by use of lines and control valves not shown, because such controls represent conventional hydraulic engineering and the details thereof are not critical to the present invention.

As previously mentioned, in accordance with the present invention, once the individual lifter frame assemblies, RA,LA are assembled, adjusted and possibly tested, they can be mounted as units on the rocking frame RF and all preliminary work on the lifter frame assemblies will have been completed except for the final connection on the various hydraulic components to the hydraulic system of the harvester.

PLOW

In the two-row harvester there is a plow and associated mounting structure for each of the lifter frame assemblies. Each plow has a share 60 that is substantially centered between the gathering points GP1,GP2 of the associated lifter frame assembly as seen in FIG. 2A. The mounting of the plows is best illustrated in FIGS. 2 and 3. Each plow share 60 depends from a forwardly projecting arm 62. In the two-row harvester embodiment, there are two such arms, 62 as seen in FIG. 3, although if one of the lifter assemblies is removed, the corresponding plow will be removed along with it. Each of the arms 62 is adjustably clamped to a pivot plate 64. The pivot plate 64 has a transversely extending hinge element 66 (FIG. 3) which element is supported on the transverse outrigger frame member 26 by ears 68 and a pivot pin 70. Welded to the pivot plate 64 is an upstanding bracket 72 and means are provided to determine the lowermost position of the plow by a connection with the bracket of 72. As seen in FIG. 2, the bracket 72 is pivotally mounted on a clevis 74. This clevis is threaded onto a rod 76. The position of the clevis along the rod is determined by adjustment of the rod 76 in the clevis and the adjustment is maintained by a locknut 78. The rear end of the plow support rod 76 is headed and slidably passes through a bracket 80, secured to the vertical post 19 of the outrigger frame structure previously described.

In order to raise the plows when the rocking frame RF is lifted to raise the lifter frame assemblies for travel along the road, a link 82 has a pivot and slot connection 83 with a sideplate 84 (FIG. 3) welded to the plow pivot plate 64. The upper end of the link 82 is pivoted at 56 to the gusset plate 48 on the inner triangular frame member 40 of the rocking frame. The pivot 56 for the link 82 is also the pivot for the rocking arm lifting cylinder 54, previously described. When the plow is being raised by the piston and cylinder assemblies 54 and the depending link 82, the stop rod 76 (FIG. 2) merely slides through the bracket 80 and the resultant swinging motion of the stop rod is accommodated by the pivotal mounting of clevis 74 on the aforesaid plate 72.

As seen in FIG. 3, in order to provide a limited lateral adjustment of each plow so that it can be approximately centered between the gathering points of the associated lifter frame assembly, the rear ends of the plow arms 62 are pivoted at 88 on the pivoted mounting plate 64. The pivot structure is reinforced by ears 90 welded to and projecting forward from the hinge portion 66 of the mounting plate 64. Hence, the pivot 88 goes through the ears 90, the plow arms 62 and the pivot plate 64.

In order to clamp each plow arm 62 in its laterally adjusted position, the pivot plate 64 is formed with transverse slots 92 (FIG. 3). U-bolts 94 having legs passing through the slots 92 and around the plow mounting arms 62 are clamped to the support plate 64 by clamp nuts on the lower ends of the two legs of each U-bolt. Thus, the arms 62 and hence the associated plow shares 60 are provided with a limited lateral adjustment necessary to maintain reasonably close centering of the plow share 60 with its associated lifter arm assembly.

LIFTER FRAME ASSEMBLIES

In the two-row harvester disclosed herein, right and left lifter frame assemblies RA,LA are fitted to the rocking frame RF. Since these lifting frame assemblies are basically identical and in fact in some cases only one may be employed, the following detailed description of a basic lifting frame assembly will first be described and the overall arrangement of the complete frame structure is best seen in the perspective view of FIG. 3, although reference will be made to other figures during the detailed description of the frame structure that follows.

The lifter frame assembly frame structure can be considered as having a main component 100 which runs from the forward end of the lifter frame assembly back to its rearward mounting on the rocking frame RF and a movable gathering component 102 which is swingably mounted on the main component. The main component 100 of the lifter frame includes a forward gathering element frame 104 which cooperates with the movable gathering component 102 to support lifter belts for bringing the uprooted crop to the topping bar assembly T, as previously described. The lifter belt and idler pulley assemblies are omitted from the diagram in FIG. 3 in order to more clearly disclose the principles of the construction of the lifter frame assembly frame structure. The main component 100 of the lifter frame not only includes the gathering element frame 104 previously mentioned, but also includes a rearwardly extending rigid structure 106 which will be referred to as the mounting element. The function of the mounting element is to mount the lifter frame assembly on the rocking frame RF as well as to support the topping bar assembly T.

The gathering element 104 of the main frame component 100 is connected to the mounted element 106 by a box-like gusset member 108, a section of which appears in FIG. 5. The mounting element 106 includes a front cross frame structure illustrated generally at 110 which structure is a fabrication of several components. One of these components is a front left or outside front depending plate 112 to which the boxlike gusset 108 for supporting the fixed gathering element 104 is welded. The plate 112 depends from a forwardly projecting cross plate 114 for mounting the mounting element 106 on the rocking frame RF. Depending from the cross plate 114 is a right or inside front depending plate 116 having a forwardly extending ear 118 for mounting the movable component 102 on the main component 100 by means of a pivoted swinging or eccentric structure S, to be described in detail presently. The mounting element 106 includes an outside or left longitudinal frame member 120 projecting rearwardly from the aforesaid depending plate 112 and a parallel right or inside longitudinal frame member 122 projecting rearwardly from the depending plate 116. The rear ends of the side frames 120,122 are connected by a rear cross frame structure indicated generally at 124. The cross frame structure 124 includes generally vertical plates 126,128 welded to the rear ends of the side frames 120,122. The upper ends of the plates 126,128 are welded to a rear cross plate 130 which is pivotally mounted at 132 to the upper rear cross member 50 of the rocking frame RF. Gussets 134,136 reinforce the connection between side frames 120,122 and the depending rear plates 126,128.

The mounting element 106 of the main frame component 100 includes structure for mounting the rear drive pulleys P1,P2 for the gathering belts as well as for mounting the rear idling ends of the two topping units T1,T2 (FIG. 5) that cooperate to form a topping bar assembly T. This structure includes downwardly depending box-like arms 140,142 (FIG. 3) welded to rear intermediate portions of the side frames 120,122, and braced by diagonal rods 143 extending between the arms 140,142 and the longitudinal frame members 120,122. Extending between the rear plates 126,128 and the depending arm 140,142 are short longitudinal reinforcing elements 144,146. In order to mount the shafts for the rear lifter belt drive pulleys P1,P2 the side frame members 120,122 are provided with upper shaft bearing blocks 150,152. The short longitudinal frame members 144,146 are provided with aligned lower bearing blocks 154,156 seen in FIGS. 3 and 5. The bearing blocks 152,156 for the right or inside pulley P2 are also clearly seen in FIG. 4.

The pulleys P1,P2 are mounted on shafts 158,160 that rotate (FIGS. 4 and 5) within the bearing blocks 150,154 and 152,156 respectively. As best seen with respect to pulley P2 in FIG. 4, the rear drive pulleys are mounted below the short longitudinal frame members 144,146.

DRIVE FRAME STRUCTURE

The drive frame structure for the lifter belt pulleys P1,P2 and the topping bar assembly T form part of the front cross frame structure 110 of the mounting element 106 of the main frame component 100 of the gathering frame assembly. As will be explained in detail presently, driving elements for each lifter frame assembly are mounted on an inverted U-shaped bracket indicated generally at 164 and best seen in FIGS. 1,2A, 3 and 4. The U-shaped bracket 164 has upright legs 166,168 (FIG. 3) projecting upwardly from the side frame elements 120,122 of the mounting element 106. The upright legs are connected by a crossleg 170 shown in fragment in FIG. 3 but appearing complete in the other figures. The mounting of the upright legs of the bracket 164 is reinforced by gussets 172 (FIG. 2) between the leg 166 and the crossplate 114 and by a gusset 174 between the leg 168 and the crossplate 114 (FIGS. 3 and 4). Rear gussets 176,178 are also welded between the upright legs 166,168 and the side frame members 120,122 (FIG. 3). As will be described, in the embodiment of the invention being shown, the crossplate 170 mounts drive motors and other structure for driving the lifter belt pulleys P1,P2 and the topping bar units.

TOPPING BAR ASSEMBLY MOUNTING

It is a feature of the present invention that both the left and right topping bar units T1 and T2 of the topping assembly T have their driving and driven ends rigidly supported on the mounting element 106 of the main component 100 of each gathering frame assembly. The basic construction and operation of the topping bar assembly T is known in the art. Such topping bar assemblies are shown in the Urschel U.S. Pat. No. 1,894,802, issued Jan. 17, 1933, as well as in other patents and the assemblies of this type were employed in the tractor mounted Model RXF Carrot Harvester manufactured by the FMC Corporation, assignee of the present invention. Accordingly, the construction and operation of the topping bar units will not be described in detail because they are conventional and the present invention is directed to improved structure for mounting and driving those units.

Each topping bar unit includes an array of elongate eliptical topping bars 180 (FIG. 6), the driven ends of which are moved in orbital fashion by a driving gearbox 182 and the idler ends of which are mounted in an idler gear box 184. The nature of the gear boxes are known in the art, are shown in the aforesaid Urschel patent and hence will not be described in detail. Each topping bar assembly T includes a left topping unit T1 and a right topping unit T2 which units cooperate in a known manner to strip the foliage from the root of the crop, such as beets or carrots. Referring to FIGS. 4 and 6, the driven gear box 182 of each topping unit is driven by a shaft 185. The components of the topping units T1,T2 are identical except that one is a mirror image of the other hence these components will be given the same reference numbers for both units. Each drive shaft 185 for a topping unit is axially supported by means of bearings (not shown) in a shaft housing 186.

Referring to FIGS. 4, 5 and 6, the shaft housings 186 for the driven shaft 185 of each topping unit are supported on the mounting element 106 of the main frame component 100. Rearward shaft housings are mounted on angle brackets 188,190 which are of the same construction except that bracket 188 is a left bracket and bracket 190 is a right bracket (FIG. 5). Each bracket has a flange 191 welded to and projected rearwardly from the associated depending plate 112,116 as well as to the associated mounting unit frame elements 120,122. Since the angle brackets are merely of right and left construction, only one of them will be described in detail. As mentioned, the angle bracket 188 (FIG. 5A) has a rearwardly projecting flange 191 that is welded to the plate 112 and a transverse flange 192 extends inwardly from the rearward end of the flange 191. As best seen in FIG. 5A, the inwardly extending flanges 192 of both brackets 188 and 190 (190 is not shown in FIG. 5A) is provided with two slots 193 for receiving clamp bolts 194 which bolts are threadedly mounted into bosses formed on the shaft bearing housing 186. Thus, if the clamp bolts 194 are loosened, the housing 186 can be adjusted along the transverse flange 192. This adjustment is provided by a stud 196 that slidably passes through an aperture formed in the longitudinal plate 191 and has its inner end threaded into the bearing housing 186. Since the stud slides freely through its aperture in the plate 191, the lateral position of the bearing housing 186 can be adjusted (when the clamp bolts 194 are loosened) by cooperating adjusting nuts 200,202 (FIG. 5A) threaded onto the stud 196. After the adjustment is completed, the clamp bolts 194 are tightened. With this construction the topping bar assemblies T1,T2 can be adjusted individually to provide the proper entry throat as well as to center the throat relative to the crop gripping reaches of the lifter belts.

As seen in FIGS. 4, 5 and 7, the idler gear boxes 184 of the topping units T1 and T2 are likewise adjustably mounted on the mounting element 106 of the main component 100 of the lifter frame assembly. Each idler gear box 184 has a depending shaft 206 that is mounted in a bearing housing 208, it being understood that as in the case of the driving shaft 184, the bearings for mounting shafts 206 in their respective bearing housings 208 are not shown since they are of conventional design, known in the art. The rear idler shaft housings 208 are mounted on a U-shaped plate 210 that extends between the vertical frame elements 140,142 of the mounting element 106, as best seen in FIG. 3. Also as seen in FIG. 3, the plate 210 is formed with longitudinally spaced slots 212 to receive clamp bolts, as will be described. The plate 210 has at each side thereof forwardly projecting flanges 214. Each idler shaft bearing housing 208 is adjustably clamped to the plate 210 by clamp bolts 216 (FIGS. 5 and 7) which pass through the slots 212 shown in FIG. 3 and which are threaded into bosses formed on the bearing housings.

As in the case of the front bearing housings 186, the rear bearing housings 208 are adjustably positioned by a stud and adjusting nut assembly. As best seen in FIGS. 5 and 7, the housings 208 have secured thereto a threaded adjusting stud 220 that is locked to the housing by a clamp nut 222. Each stud 220 is slidably mounted in an aperture formed in the associated forwardly projecting flange 214. When the clamp bolts 216 are loosened, manipulation of adjusting nuts 224,226 will shift the idler bearing housings 208 laterally so that the relative position of exit ends of each topping bar unit on the mounting frame element 106 can be adjusted for optimum operation. Thus, not only are both ends of the topping units T1,T2 rigidly mounted on the mounting element 106 of the main component 100 of the lifter frame assembly, but both ends of the topping units can be laterally adjusted to provide the proper entry throat and the proper relative spacing of the topping or roller bars 180 of each unit.

SWING MOUNTING

As previously mentioned, the movable gathering component 102 of the gathering element is mounted on the mounting element 106 of the main component 100 by a swing or eccentric mounting S. This mounting accommodates lateral shifting of the movable component 102 relative to the gathering element 104 (FIG. 3). The toggle spreader arches L1,L2 are manually actuated to separate the gathering elements to clear jams, replace belts, or the like. Referring to the swinging element S, it comprises an eccentric link 230 which has connected pivot sleeves 232,234, connected by vertically spaced longitudinally extending webs 235 (FIG. 4). The rear sleeve 232 of the element S is pivotally mounted on the mounting element 106 of the main component 100 of the lifting frame (FIGS. 3 and 4) between a rear flange portion of the cross bracket 114 previously mentioned and the ear 118 projecting from the depending plate 116. This pivotal mounting is effected by a vertical pivot rod 236. The front pivot sleeve 234 of the swinging element S is pivotally mounted between the rear end portion of the movable gathering component 102 and an upwardly projecting U-shaped bracket 238, (FIGS. 2A and 4). A pivot rod 240 for the front pivot sleeve 234 extends between the rear end of the movable gathering component 102 and the upper end of the aforesaid bracket 238. Some of the parts referred to appear in section in FIG. 5. This construction accommodates lateral or spreading movement of the movable gathering component 102 relative to the fixed gathering element 104 without the use of prior sliding rod constructions which rust up and accumulate a build up of foreign materials that hinders lateral motion of the movable gathering component.

SPREADER ARCHES

The spreader arches L1,L2 previously mentioned, connect the movable gathering component 102 to the fixed gathering element 104 of the main gathering frame component 100. These arches are of known design and construction and have been employed, for example, on the model RXF carrot harvester manufactured by the FMC Corporation.

The purpose of the spreader arches L1,L2 is to enable the operator to manually separate the movable component 102 from a fixed element 104 to clear jams, change belts, or the like. The spreaders also incorporate adjusting screws and nut structure for setting the pressure exerted by the idler pulleys for the lifter belts (to be described) which are disposed along the crop lifting reaches of the lifter belts.

The spreader arches L1,L2 are functionally identical but their operating handles extend longitudinally in opposite directions. Briefly, each spreader element is pivotally mounted on the fixed gathering element 104 by pivot rod 244 (FIGS. 3 and 5). Surrounding the pivot rod 244 is a sleeve 265 that mounts a transverse link 266. The link 266 has an intermediate projecting ear 268 that is pivotally mounted at 269 to an opening and closing handle 270. The handle 270 has an offset end portion that pivotally supports a swivel 272. The swivel 272 adjustably mounts a threaded rod 274 that is clamped to the swivel by opposed adjusting nuts seen in FIG. 3. The free end of the rod 274 is flattened and pivoted at 276 on the upper end of a rod that projects up from the movable gathering component 102. A sleeve 278 surrounds the rod and its upper end is formed with a short arm 280. The free end of the arm 280 is pivoted at 282 to the free end of the transverse link 266.

When the handle 270 is swung from the position illustrated in FIG. 3, the linkage just described separates the movable gathering component 102 from the fixed gathering element 204 for clearance of jams or the like. The adjusting nuts on each side of the swivel 272 determine the tension applied by spring loaded idler pulleys to the gathering reaches of the lifter belts, to be described presently. When the spreader arches L1,L2 are in the position of FIG. 3, an overcenter toggle action holds them in that position, in a manner well known.

LIFTER BELT AND PULLEY CONSTRUCTION

Each gathering frame assembly includes a pair of lifter belts B1,B2. The lifter belt B1 on the main frame component 100 passes over the rear drive pulley P1 and a front drive pulley P3, the latter best seen in the schematic diagram of FIG. 3. The lifter belt B2 passes over the rear drive pulley P2 and the front drive pulley P4 on the movable gathering component 102. Each of the lifting belts has a gathering or lifting reach that grasps the crowns or foliage of the uprooted root crop for carrying the uprooted crop back to the topping assembly T. Here the topping bars 180 of the topping units T1,T2 pinch the foliage from the roots and drop the roots onto the conveyor C. The two lifting reaches extend between the fixed gathering element 104 and the movable gathering component 102. As seen in FIGS. 5 and 8, the lifter reaches are pressed together by alternately disposed spring loaded idler pulleys 280, these pulleys being staggered along the lifter reaches. Each pulley 280 is mounted on an arm 282 that is pivotally mounted at 284 on the gathering element 104 or the movable component 102, as the case may be. The free end of each arm 282 is connected to one end of a spring 286. The other end of which is connected to either the fixed gathering element 104 or the movable component 102. Thus, the idler pulleys 280 urge the lifting reaches of the lifter belts B1,B2 together between the forward end of the gathering frame assembly where the lifter belts first grasp the foliage of the uprooted crop and the entry throat of the topping bar assembly T. It is noted that in the harvesters of the present invention, neither vertical nor lateral pivoting motion of the lifter frame assembly causes flexing of the lifter belts relative to the topping bars and hence alignment of the topping bar units T1,T2 with the associated lifter belts is always maintained as the entire lifter assembly is either vertically pivoted about the rocking frame pivot 52 or horizontally pivoted about the rear pivots 132.

Foliage stripped off the root crop by the right lifter frame assembly RA (FIGS. 1 and 2) is transferred rearwardly by the lifter belts past the idler ends of the topping bar assembly T and is dropped in the ground through a gap between the frame members 12a and 20 (FIG. 1). Foliage stripped from the root crop by the topping bar of the left lifter frame assembly LA is likewise carried past the idler ends of the topping bar assembly T and is thereafter pushed along curved slide bars 290,291 into the same gap between the frame members 12a and 20, previously described.

Conveyor

The harvester disclosed includes a conveyor system that has a lower transverse running reach for receiving the root crop after the topping assembly has stripped the foliage therefrom and for elevating and delivering the root crop to a vehicle running alongside the harvester. The details of the elevator construction are not critical to the present construction and will only be briefly described.

Referring to FIGS. 1, 2A and 4, the conveyor C has a lower transversely running crop catching reach 300 which receives roots of the crop once the foliage has been stripped by the topping bar assembly T. As best seen in FIG. 2A, the conveyor C also includes an elevating reach 302 and a horizontal discharge reach 303. The conveyor is in the form of an endless belt 304 having longitudinally spaced conveying slats 306 projecting from the belt. The pulley system for the conveyor C is shown complete in FIG. 2A. The endless belt 304 is driven by a hydraulic motor 310 and an associated drive roller at the discharge end of the conveyor. The upstream end of the conveyor belt passes around an idler roller 312 shown at the lower right of FIG. 2A. At the transition from the horizontal reach 300 to the elevating reach 302, the upper reach of conveyor belt 304 is guided by laterally spaced idler pulleys 314 shown in dotted lines in FIG. 1. The upper reach of the elevating section 302 of the conveyor belt passes over spaced idler pulleys 316 (FIG. 2A) which change the direction of the belt from an upwardly inclined path to the generally horizontal discharge path 303. The upper reach of the conveyor then passes around the roller driven by the hydraulic motor 310 and the return reach pass over laterally spaced directly changing pulleys 318 that cooperate with the pulleys 316. The return reach is further supported by laterally spaced pulleys 320 and where the return reach changes from the downwardly running path to the horizontal return path, the lower reach passes over pulleys 322. The lower section of the return reach then passes around the upstream idler roller 312, previously described.

The framework for the entire conveyor C is formed of three sections pivotally connected. Referring to FIG. 2A, these sections are a lower transverse frame section 330, an elevating section 332 pivotally connected to the transverse section at 334 and an upper discharge section 336 pivotally connected to the elevating frame section 332 at 338.

A cross section of the transverse frame section 330 for the conveyor appears in FIG. 4 and this construction is typical in the elevating and discharging frame sections 332,336.

Referring to FIG. 4, the lower horizontal section 330 of the conveyor includes a forward side plate 340 secured to the forward transverse frame member 26 and a rear side plate 342 secured to the rear transverse frame member 28. These side plate structures are mirror images of one another and hence only one need be described in detail. Each side plate includes a vertical flange 344 having an upper lip 346 for supporting the upper reach of the conveyor belt 304 and a lower lip 348 for supporting the lower or return reach of the belt. Each side plate 340,342 includes a box-like frame structure 350 that runs the full length of the lower section 330 (FIG. 1) and which is spaced slightly from the associated lip 346 to receive the belt 304 and which also forms a confining side wall for the associated side of the flights 306. The elevating and discharge frame structure 332,336 are similarly formed.

As indicated in phantom lines in FIG. 2A the elevating frame section 332 can be swung vertically about the pivots 334 toward the center of the machine within the lateral confines of the harvester and the discharge section 336 can be swung down about the pivots 338 for road transport. The elevating section 332 is positioned by hydraulic piston and cylinder assembly (FIG. 2A) 354 pivotally connected at 357 to a bracket 356 on the harvester frame and to a bracket 358 on the elevating section frame at 359. The position of the discharge section 336 is controlled by a hydraulic piston and cylinder assembly 360 with its cylinder pivotally connected at 361 to a bracket 362 on the frame of the elevating section 332 and with its piston rod 360a pivoted at 363 to one end of a link 364. The other end of the link 364 is pivoted at 365 to a bracket 366 on the discharge frame section 336. In order to properly constrain the piston rod 360a of the piston and cylinder assembly 360 as the discharge frame section 336 of the conveyor is swung around its pivots 338 one end of a control link 370 is pivoted at 374 to one side frame of the elevating frame section 332 of the conveyor.

Lifter Assembly Drives

Details of the driving structure for the lifter assemblies RA,LA are best shown in FIGS. 4,4A and 4B. FIG. 4 is a section which illustrates the drive for the right topping unit T2 and the lifter belt B2 that is, the drive for one half of the left lifter frame assembly LA. The driving connections for the left topping unit T1 and the other lifting belt B1 for the assembly are similar and can be seen, for example, in FIGS. 1 and 2A. The drives for the right lifter frame assembly RA are like those for the left lifter frame assembly because these assemblies are, except for the guide bars 290,291 (FIGS. 1 and 2), identical. As seen in FIGS. 1 and 2A the units of the lifter frames are driven by motors M1,M2.

Referring principally to FIGS. 4,4A and 4B, in the embodiment illustrated, a hydraulic motor M2 drives the driven gear box 182 of the right topping unit T2 directly through shafting and the rear driving pulley P2 is driven from the topping unit by a chain and sprocket assembly. In the embodiment illustrated, the drive for the lifter frame assembly is mounted on the U-shaped bracket 164 and more particularly on the cross member 170 of that bracket.

Each topping unit is driven from a shaft 380 which is mounted (FIG. 4B) in upper lower bearings 382,384 fitted in a split gear housing 388. Each of the two shafts 380 for a lifter frame assembly mounts a synchronizing gear 390 within the housing 388 and as seen in FIG. 4A, the two synchronizing gears 390 are meshed so that the shafts 380 for the topping units drive the topping units in synchronism and hence keep the topping bars 180 in their adjusted relative positions required for removing the crowns from the root crops without interference. As seen in FIG. 4, the shaft 380 for the topping unit T2 is driven by the hydraulic motor M2, which also drives the associated lifter belt B2. For example, as seen in FIG. 4, the motor M2 is mounted on the associated shaft 380 by a split clamp 391 coupled to the shaft 380 and to the drive shaft of the motor. The reactive drive torque from each motor is absorbed by a bracket 392 upstanding from the U-shaped bracket crosspiece 170 and torque arms 394 connected to the lower end of each motor housing project through apertures in the bracket 392.

Each motor drive shaft 380 drives the drive shaft 185 for the associated topping unit through an articulate shaft 398 connected at its upper end to the shaft 380 by a universal joint 400 and connected at its lower end to the drive shaft 185 for the associated topping unit by a second universal 402 (FIG. 4). As seen in FIG. 2A, for example, the aforesaid universal joint mounting of the articulated shafts 398 permits the shafts to diverge from their respective drive shafts 380 for alignment with the drive shafts 185 of the topping units T1,T2 that go to make up each topping assembly T.

In the embodiment of the invention illustrated, the rear drive pulleys, such as a pulley P2 for the lifter belt B2 shown in FIG. 4, are driven by a chain and sprocket assembly indicated generally at 406 which is driven from the drive shaft for the driven gear box 182 of the associated topping unit. A sprocket 408 seen from the side in FIG. 4 and indicated in phantom in FIG. 5 is mounted on the shaft 185 just above the driving gear box 182 for each topping unit. Trained around the drive sprocket 408 is a chain 410 which drives a sprocket 412 shown broken away in FIG. 5 and appearing in the side view of FIG. 4. The sprocket 412 is mounted on the drive shaft 160 for the associated rear driving pulley for each lifting belt. In FIG. 4, the driving pulley P2 for the lifter belt B2 is shown as driven by the chain and sprocket assembly 406. With this construction, all of the drives for the lifter frame assemblies are supported by the mounting element 106 of the main component 100 of each lifter frame assembly and therefore the adjustment and alignment of the drives for the lifter frame assemblies are not affected by either vertical or lateral pivotal motion of these assemblies relative to the main frame of the harvester.

Having concluded a detailed description of the harvester of the present invention, it can be seen that each lifter frame assembly is in effect a single unit wherein all the working parts may be assembled, adjusted before the assembly is mounted in the harvester. Furthermore, the vertical motion of the lifting frame assembly and lateral swinging action thereof relative to the harvester has no effect on the alignment and adjustment of the moving parts of the lifter frame assemblies.

Although the best mode contemplated for carrying out the present invention has been herein shown and described, it will be apparent tha modification and variation may be made without departing from what is regarded to be the subject matter of the invention as defined in the appended claims.

What we claim is:

1. In a root crop harvester of the type comprising a wheeled chassis having a main frame, a plow on said main frame, a product lifter frame assembly comprising right and left gathering points and lifter belts, topping means comprising cooperating elongate topping units for topping crop received from the lifter belts, each topping unit having a driven end and an idler end, means for driving said lifter belts and the driven end of each topping unit, and means for pivotally mounting said lifter frame assembly on said main frame; the improvement wherein each lifter frame assembly includes a rigid main component that includes a fixed gathering element extending rearwardly from a gathering point and an integral rearward mounting element, a movable gathering component adjustably supported on said main component of the lifter frame assembly, means for pivotally mounting a rearward portion of said mounting element on said lifter assembly mounting means for accommodating lateral adjustment of said lifter frame assembly, means for rigidly mounting the driven ends of said topping units on a forward portion of said mounting element, and bracket means projecting down from a rearward portion of said mounting element for mounting the idler ends of said topping units.

2. In a root crop harvester of the type comprising a wheeled chassis having a main frame, a plow on said main frame, a product lifter frame assembly, each lifter frame assembly comprising right and left lifter frames mounting a gathering point and a lifter belt, topping means comprising cooperating elongate topping units for topping crop received from the lifter belts, each topping unit having a driven end and an idler end, means for driving said lifter belts and the driven end of each topping unit, means for mounting said lifter assembly on said main frame comprising a rigid rocking frame having laterally spaced side members connected by transverse upper rear and lower forward transverse members, and means for pivotally mounting said side members on the main frame; the improvement wherein each lifter frame assembly includes a rigid main component that extends rearwardly from a gathering point to provide a forward gathering frame element and a rearward mounting element, a movable gathering element, means for adjustably supporting said movable gathering element on said main component of the lifter frame assembly, means for pivotally mounting a rearward portion of said mounting element on said upper rear transverse member of said rocking frame for accommodating lateral adjustment of said lifter frame assembly, means for rigidly mounting the driven ends of said topping units on a forward portion of said mounting element, and bracket means projecting down from a rearward portion of said mounting element for mounting the idler ends of said topping units.

3. The harvester of claim 2, wherein the side members of said rocking frame are formed as open triangular legs having two of their intersections respectively connected to said upper rear and lower forward transverse members with their third, lowermost intersection pivoted to said main frame.

4. The harvester of claim 2, comprising an inverted U-shaped bracket having legs projecting upwardly from a forward portion of said mounting element and a cross leg, a pair of motors on said cross leg, and articulated shafts connecting said motors to the driven ends of said topping units.

5. The harvester of claim 4, comprising means for gearing said motors together for synchronized rotation thereof.

6. The harvester of claim 2, wherein said means for adjustably supporting said movable gathering element includes a swinging bracket, means for pivotally mounting a front portion of said bracket on said movable gathering element and means for pivotally mounting a rear portion of said bracket on the mounting element of said rigid main component of the gathering frame assembly.

7. In a root crop harvester of the type comprising a wheeled chassis having a main frame, a plow on said main frame, a product lifter frame assembly, each lifter frame assembly comprising right and left lifter frames mounting a gathering point and a lifter belt; topping means comprising cooperating elongate topping units for topping crop received from the lifter belts, each topping unit having a driven end and an idler end, means for driving said lifter belts and the driven end of each topping unit, means for mounting said lifter assembly on said main frame comprising a rigid rocking frame having laterally spaced side members connected by transverse upper rear and lower forward transverse members, and means for pivotally mounting said side members on the main frame; the improvement wherein each lifter frame assembly includes a rigid main component that extends rearwardly from a gathering point to provide a forward gathering frame element and a rearward mounting element, said mounting element having one side frame that extends rearwardly from said gathering element and a laterally spaced side frame, front and rear cross frame structures connecting said side frames, means for swingably mounting a gathering frame element on said laterally spaced side frame, means for pivotally connecting said mounting element to said upper rear transverse member of said rocking frame for accommodating lateral adjustment of said lifter frame assembly, means for rigidly mounting the driven ends of said topping units on forward portions of the side frame structures of said mounting element, and means on a rearward portion of said mounting element for mounting the idler ends of said topping units.

8. In a root crop harvester of the type comprising a wheeled chassis having a main frame, a plow on said main frame, a product lifter frame assembly, each lifter frame assembly comprising right and left lifter frames mounting a gathering point, a forward idler pulley, a rear driven pulley and a lifter belt trained around said pulleys; topping means comprising cooperating elongate topping units for topping crop received from the lifter belts, each topping unit having a driven end and an idler end, means for driving said lifter belts and the driven end of each topping unit, and means for pivotally mounting said lifter frame assembly on said main frame; the improvement wherein each lifter frame assembly includes a main component that extends rearwardly from a gathering point to provide a forward gathering element frame and an integral rearward mounting element, a movable gathering element adjustably supported on said main component of the lifter frame assembly, means for pivotally mounting a rearward portion of said mounting element on said lifter assembly mounting means for accommodating lateral adjustment of said lifter frame assembly, means for rigidly mounting the driven and idler ends of said topping units on said mounting component of the main component of said lifter frame assembly, shaft means mounted at the rear of said mounting frame component for mounting the lifter belt drive pulleys, a chain and sprocket drive assembly connecting each drive pulley shaft means with the driven end of the associated topping unit, and motor means for driving said chain and sprocket drive assemblies.

9. The harvester of claim 8, wherein said motor means comprises a separate motor for driving each chain and sprocket assembly, and means for gearing said motors together for synchronized rotation.

10. The harvester of claim 9, wherein said motors drive the driven ends of said topping units, the driving sprockets of said chain and sprocket assembly being mounted on said driven ends.

11. In a root crop harvester of the type comprising a wheeled chassis having a main frame, a plow on said main frame, a product lifter frame assembly, each lifter frame assembly comprising right and left gathering elements comprising lifter belts for delivering the crop to cooperating elongate multibar topping units for topping crop received from the lifter belts, each topping unit having a driven end for driving the bars and an idler end, means for driving said lifter belts and the driven end of each topping unit, and rocking frame means for mounting said lifter frame assembly on said main frame for pivotal motion about a horizontal axis; the improvement wherein said lifter frame assembly comprises a main component having a rigid mounting element at the rear of the harvester, and one gathering element fixed to said main component and projecting forwardly, a generally parallel movable gathering element adjustably mounted on said main component, said mounting element extending rearwardly past said topping units, single pivot means for pivotally mounting the rear end of the rigid mounting element of said lifter frame assembly on said rocking frame means for accommodating simultaneous lateral adjustment of both gathering elements, and means for rigidly mounting both the driving and driven ends of each topping unit directly on the rigid mounting element of said lifter frame assembly.

* * * * *